June 14, 1932.  I. R. OLSON  1,862,545
VALVE
Filed May 21, 1931
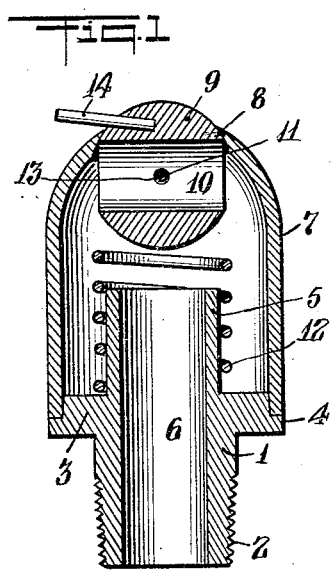
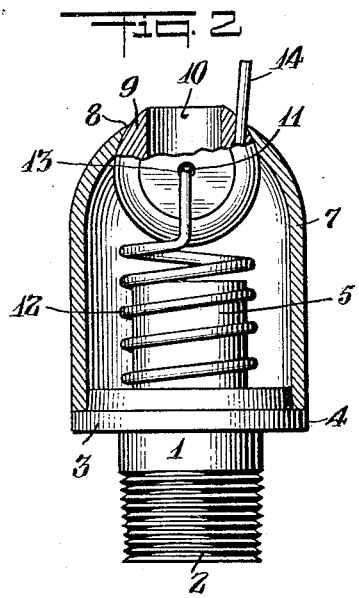
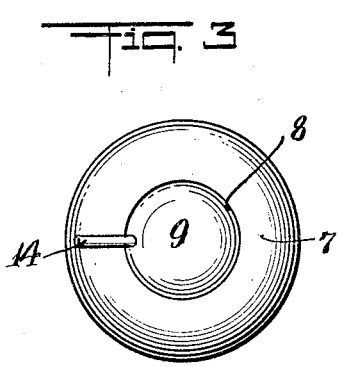
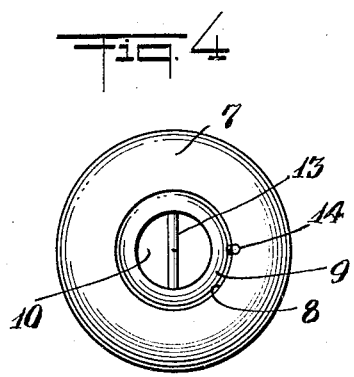
Ingeborg R. Olson
INVENTOR
BY Robert B. Killgore
ATTORNEY Patented June 14, 1932

1,862,545

UNITED STATES PATENT OFFICE

INGEBORG R. OLSON, OF BROOKLYN, NEW YORK

VALVE

Application filed May 21, 1931. Serial No. 538,987.

My invention relates to valves for opening and closing a passage and it is my object to produce a ball valve which is held to its seat by spring pressure and in which the passage through the ball will always aline with the passage through the body when open and will close the passage when shut, which is simple, cheap to manufacture and easy to assemble. My valve is particularly applicable to such uses as oilers for machinery and vent valves for the escape of air or gas or the like.

In the drawing, in which I show my invention embodied in a machinery oiler, Fig. 1 is a sectional view of my valve in closed position; Fig. 2 is a like view of the valve in open position; Fig. 3 a top view of the structure of Fig. 1; and Fig. 4 a like view of the structure of Fig. 2.

The form of the invention shown in the drawing comprises a lower body 1 having the threaded end 2, adapted to be screwed into a pipe or lead, a base plate 3 with a stepped edge 4, a centrally arranged upwardly extending guide sleeve 5, and a passage 6 therethrough. This may be die cast for cheapness of production.

The upper body 7 has a centrally arranged opening 8 in its upper end and the internal diameter is a force fit for the stepped edge 4 of the lower body plate 3. This upper body may be die cast or drawn for cheapness of production.

The ball or valve proper 9 has a passageway 10 therethrough and bearing holes 11—11 at right angles to the passageway 10 and located on an axis of the ball.

A helical spring 12 has its upper end bent into a cross bearing shaft 13 and the coils have a slightly larger diameter than the diameter of the sleeve 5 on the lower body, the sleeve serving as a guide for the spring.

An operating finger 14 may be inserted in the ball adjacent the passageway therethrough.

To assemble the valve the ball is placed on the cross bearing shaft of the spring 12. The ball and spring are dropped into the upper body 7 with the finger 14 extending through the opening 8, the coils of the spring are slipped over the sleeve 5 on the lower body and the upper and lower bodies pressed together.

Instead of a force fit the two parts of the body of the valve may be threaded, set screwed or fastened together in any other manner.

Instead of a threaded connection 2 any other desired connection may be employed to secure the valve to the article on which it is to be used.

By this construction the ball is pressed to its seat inside the upper body 7 by the spring 11 and can rotate only on the cross bearing shaft 13 thus holding the passageway through the ball in line with the passage in the upper body.

To open the valve the ball is revolved on the cross shaft 13 (preferably by the finger 14 which is so located that when it strikes the side of the opening 8 the two passages aline) until the passageway 10 alines with the passageway 8 in the upper body 7 when the spout of an oil can may be inserted to introduce oil or to permit the escape of gas or liquid.

To close the valve the ball is revolved until the solid part covers the opening 8.

By this construction the ball is not only held on its seat by spring pressure but the cross bearing shaft portion of the spring compels the ball to rotate on an axis so that the passageway therethrough is alined with the opening in the upper body when the valve is in its open position.

I claim:—

1. A valve comprising a lower body provided with a passage therethrough, a hollow upper body provided with an opening at its upper end, a ball provided with a passage therethrough bearing on a seat surrounding said opening in the upper body, bearings on said ball on an axis thereof and at right angles to the passage therethrough, a cross shaft engaging said bearings and a spring pressing said cross shaft and ball against said seat.

2. A valve comprising a lower body provided with an opening therethrough, a guide sleeve thereon, means for attaching the lower body to an article, a hollow upper body provided with an opening at its upper end, a helical spring co-operating with said guide sleeve so as to be guided thereby, a cross bearing shaft on the upper end of said spring, a ball provided with an opening therethrough and bearings on an axis thereof at right angles to the opening therethrough, said bearings being mounted on the spring cross shaft whereby the ball is adapted to rotate on a fixed axis and be forced against a seat surrounding the opening in the upper body.

3. A valve comprising a lower body provided with a passage therethrough, a guide sleeve thereon, means for attaching said lower body to an article, a hollow upper body provided with an opening at its upper end, a helical spring co-operating with said guide sleeve so as to be guided thereby, the upper end of the spring terminating in a cross shaft, a ball provided with an opening therethrough and bearings on the axis thereof at right angles to the opening, said bearings being mounted on the spring cross shaft whereby the ball is adapted to rotate on a fixed axis and be forced against a seat surrounding the opening in the upper body, and a finger mounted on said ball and extending through the opening in the upper body.

In testimony whereof I have affixed my signature.

INGEBORG R. OLSON.